United States Patent
Schuster

(10) Patent No.: US 6,412,604 B1
(45) Date of Patent: Jul. 2, 2002

(54) DEVICE FOR TRANSFERRING ENERGY TO A VEHICLE OF A TRANSPORTATION SYSTEM

(75) Inventor: Kilian Schuster, Ballwil (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/579,415

(22) Filed: May 25, 2000

(30) Foreign Application Priority Data

May 25, 1999 (EP) .............................. 99810450

(51) Int. Cl.$^7$ .................................................. B66B 1/06
(52) U.S. Cl. ...................................... 187/290; 320/108
(58) Field of Search .............................. 187/277, 289, 187/290, 413; 320/108, 109, 112, 113; 318/135, 687, 105, 156; 307/64, 65, 66, 67

(56) References Cited

U.S. PATENT DOCUMENTS

| | | | | |
|---|---|---|---|---|
| 4,303,870 A | * | 12/1981 | Nakamura et al. ........... | 318/135 |
| 4,402,386 A | * | 9/1983 | Ficheux et al. ............ | 187/29 R |
| 4,623,869 A | * | 11/1986 | Marabashi .................. | 455/612 |
| 4,817,533 A | * | 4/1989 | Azukizawa et al. ........... | 320/2 |
| 5,074,384 A | * | 12/1991 | Nakai et al. .................. | 187/94 |
| 5,141,082 A | * | 8/1992 | Ishii et al. ................... | 187/110 |
| 5,341,280 A | * | 8/1994 | Divan et al. .................... | 320/2 |
| 5,501,295 A | | 3/1996 | Müller et al. | |
| 5,566,784 A | * | 10/1996 | Rennetaud .................. | 187/249 |
| 5,714,864 A | * | 2/1998 | Rose et al. ..................... | 320/2 |
| 6,028,413 A | * | 2/2000 | Brockmann ................. | 320/108 |

FOREIGN PATENT DOCUMENTS

| | | |
|---|---|---|
| DE | 27 23 889 | 11/1978 |
| DE | 195 19 881 | 7/1996 |
| DE | 197 05 301 | 10/1998 |
| EP | 0 048 847 | 4/1982 |
| JP | 5000779 A * | 1/1993 ................ 187/277 |
| WO | WO 98/58866 | 12/1998 |

OTHER PUBLICATIONS

Article entitled "Power Electronics for Propulsion and Energy Charging of Electric Vehicles by High Slip Linear Induction Machines" by G. D'Angelo, et al., pp. 37 to42, dated 1998 IEEE.

Article entitled "A Novel Oscillating Rectenna for Wireless Microwave Power Transmission" by James O. McSpadden, et al., pp. 1161–1163, dated 1998 IEEE.

Article entitled "Investigation of Laser–Induced Thermo-electric Response in Normal State HTS Films" by H.S. Huang, et al., appearing in PHYSICA, 1997 (pp. 1273–1274).

* cited by examiner

Primary Examiner—Jonathan Salata
(74) Attorney, Agent, or Firm—Cohen, Pontani, Lieberman & Pavane

(57) ABSTRACT

A vehicle of a transportation system is moved by a drive supplied with electrical energy from an energy store. For the purpose of loading the energy store at a stop, a supply unit is provided, by which energy from a stationary energy supply, for example the public power supply or a solar generator, is transferred wirelessly to the energy store. A modulator raises the frequency of the energy to a higher level. The energy is transferred from the primary winding of a coupling transformer across an air gap to a secondary winding. The primary winding is stationary and the secondary winding is located on the vehicle. The energy, whose frequency is set at a high level to improve the energy density, is delivered to a demodulator on the vehicle side which, under the control of a controller, converts the energy into a form suitable for charging the energy store.

3 Claims, 3 Drawing Sheets

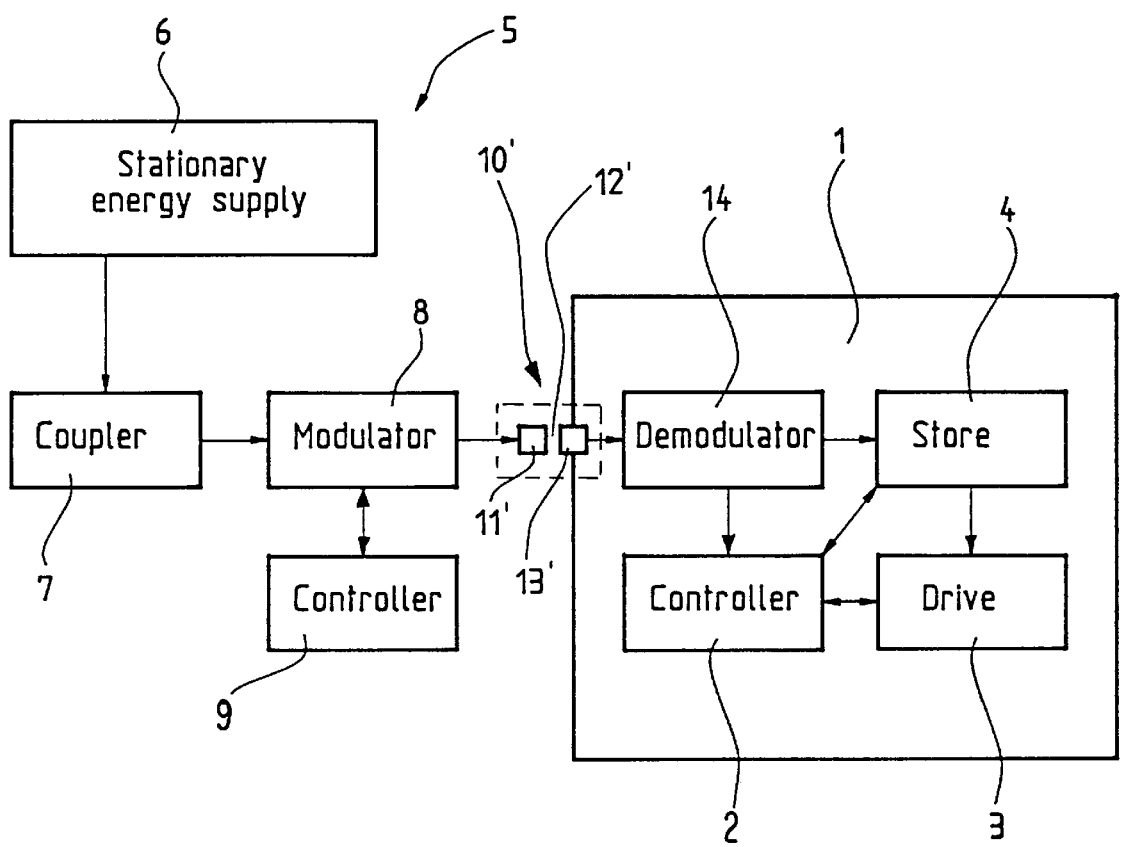

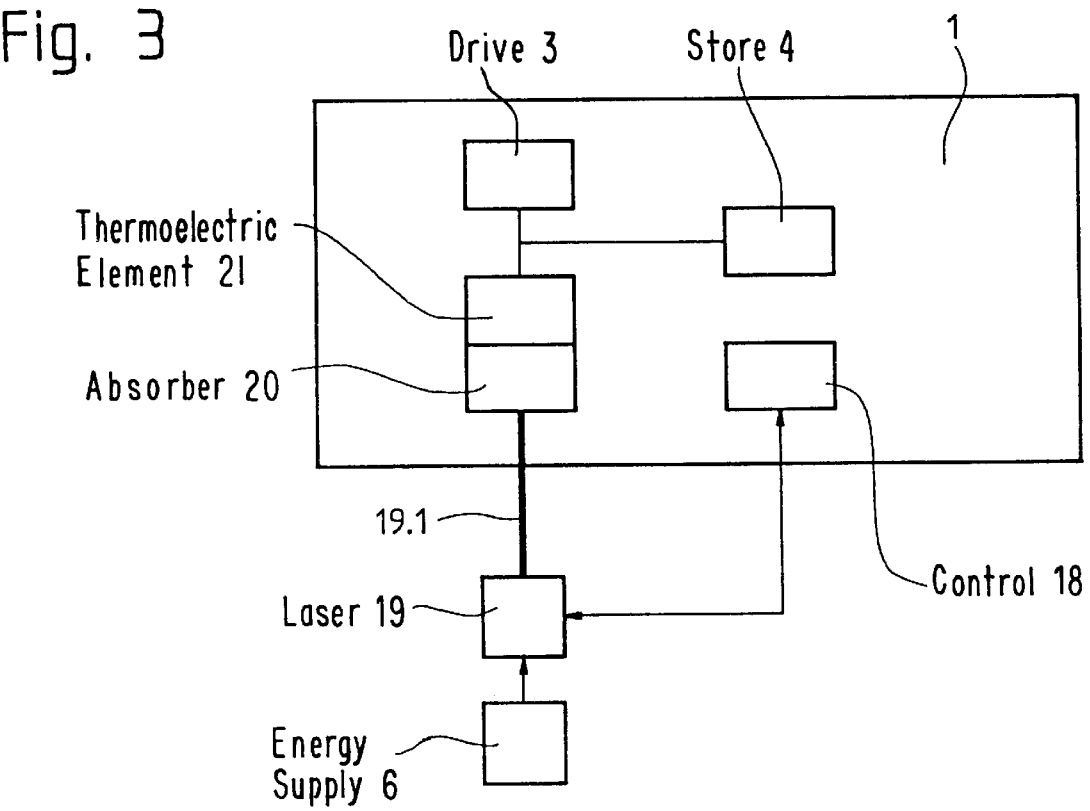
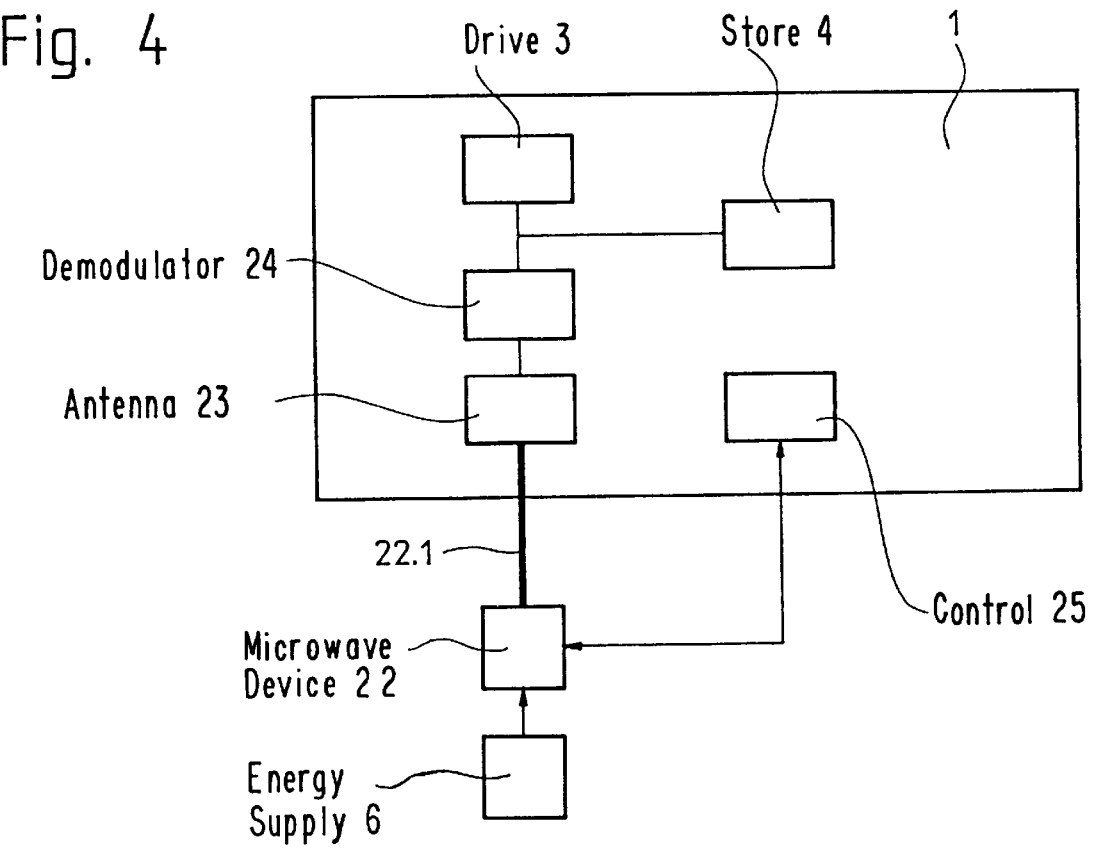

DEVICE FOR TRANSFERRING ENERGY TO A VEHICLE OF A TRANSPORTATION SYSTEM

SUMMARY OF THE INVENTION

1. Field of the Invention

The invention relates to a device for transferring energy to a vehicle of a transportation system, energy from a stationary energy supply being transferable to the vehicle which has a drive for moving the vehicle.

2. Discussion of the Prior Art

From European reference EP 0 048 847, an elevator car driven by a linear motor is known which has a battery mounted on the counterweight to supply the linear motor. For the purpose of transferring energy, the battery can be docked to the power supply at a stop intended for that purpose, or charged via a solar generator.

A disadvantage of the known device is that transfer of energy is not always assured, because the current connectors become dirty or mechanically worn due to the docking procedure.

SUMMARY OF THE INVENTION

It is an object of the present invention to provide a remedy to this problem. Pursuant to this object, and others which will become apparent hereafter, one aspect of the present invention resides in a device for transmitting energy to a vehicle of a transportation system, which device includes a stationary energy supply and means operatively connected between the energy supply and the vehicle for wirelessly transmitting energy from the energy supply to the vehicle.

In one embodiment of the invention the means for transferring energy includes means for inductively transferring the energy. The inductive transferring means includes a coupling transformer which has a stationary primary winding and a secondary winding on the vehicle so that a transfer of energy takes place across an air gap between the primary winding and the secondary winding.

The advantages achieved by the invention relate mainly to the fact that by means of the maintenance-free energy supply, the vehicles can be kept in operation permanently and without interruption for maintenance, which significantly improves the performance of the entire transportation system. A further advantage is that no traveling or trailing cables are necessary. As a result, the vehicles are more independent, have greater freedom of movement, and can travel any distance. Furthermore, the vehicles can continue to operate even when power outages occur.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 1a is a view as in FIG. 1 with a linear motor;

FIG. 3 shows an optical transfer of energy between a stationary energy supply and a vehicle; and FIG. 4 shows the transfer of energy by means of microwaves.

DETAILED DESCRIPTION OF THE PREFERRED EMBODIMENTS

Figure 1:
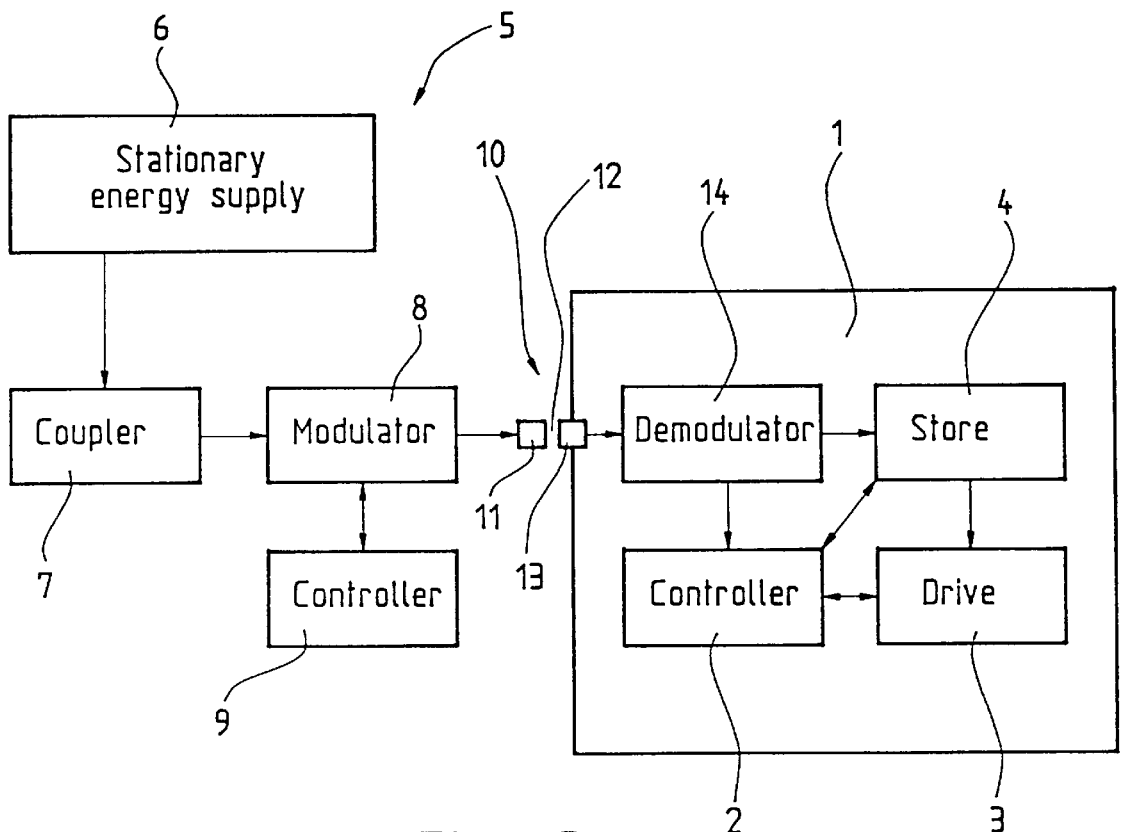
FIG. 1 is a block diagram showing localized inductive transfer of energy between a stationary energy supply and a vehicle pursuant to the present invention.

FIG. 1 shows an exemplary embodiment of wireless transmission of energy to a vehicle 1 of a transportation system which can be, for example, an elevator system with at least one elevator hoistway in which at least one vehicle, or more specifically at least one elevator car 1, operates, which with respect to control 2 and drive 3 has great autonomy, and whose direction of movement can be vertical and/or horizontal. The vehicle 1 is moved by means of the drive 3. The drive 3 is supplied with electrical energy from an energy store 4, for example a battery. For the purpose of loading the energy store 4 while the vehicle 1 is at rest there is, for example, at least one stop a supply unit 5 by means of which electrical energy from a stationary energy supply 6, for example from the public power supply or from a solar generator, is transferred to the energy store 4. A coupler 7 forms the connection between the stationary energy supply 6 and a modulator 8, which under the control of a controller 9 raises the frequency of the energy to a higher level and delivers it to a coupling transformer 10. The energy is transferred from a primary winding 11 of the coupling transformer 10 across an air gap 12 to a secondary winding 13, the primary winding 11 being stationary and the secondary winding 13 being located on the vehicle 1. The energy, whose frequency is set at a high level to improve the energy density, is delivered to a demodulator 14 on the vehicle side, which under the control of the controller 2 converts the energy into a form suitable for charging the energy store 4.

Figure 2:
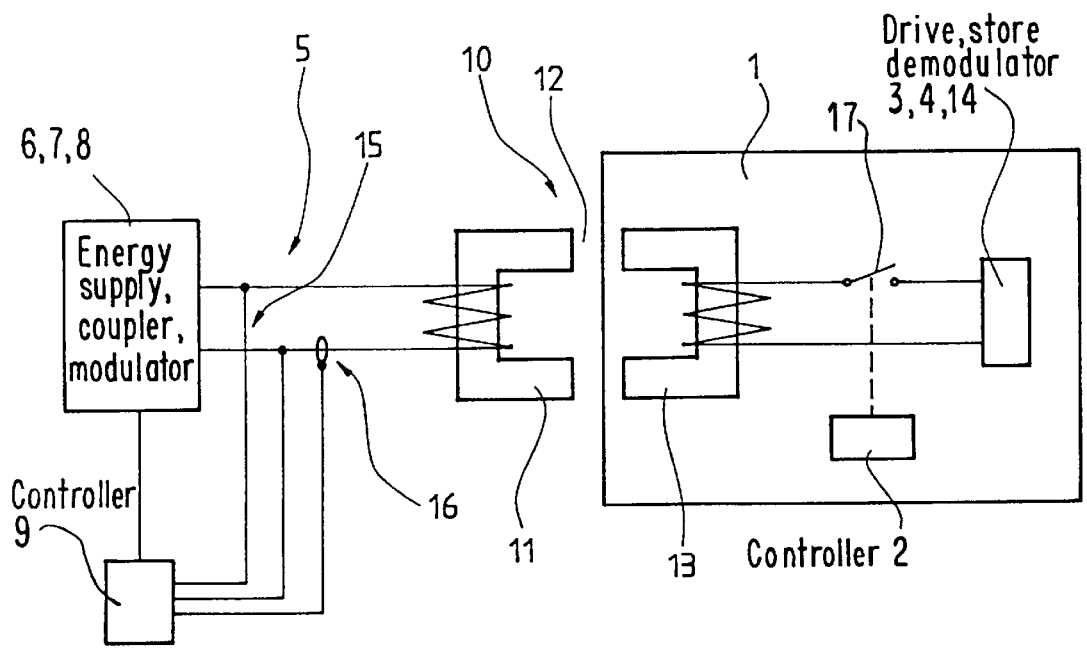
FIG. 2 shows details of the localized inductive energy transfer.

FIG. 2 illustrates how the transmission of energy takes place when inductive coupling is used, the flow of energy itself serving as reference value. With inductive coupling there is feedback from the vehicle 1, as the energy receiver, to the supply unit 5 as the energy transmitter. The complex voltages 15, are measured on the energy transmitter side, and from them the impedance of the energy receiver is determined. The lower the impedance, the more energy is delivered by the modulator 8 to the coupling transformer 10. On the energy receiver side, when energy is required it is sufficient for a switch 17 to be closed by the control 2, and for it to open again when no energy is required. By closing the switch 17 the demodulator 14 is connected to the secondary winding 13 of the coupling transformer 10, which causes the value of the load impedance to fall. This is registered by the controller 9 of the supply unit 5, and the flow of energy is increased. If the switch 17 is opened, the load impedance increases sharply and the flow of energy is reduced by the controller 9.

If a modulator/demodulator is provided both on the stationary side and on the vehicle side, and the drive 3 has a control and a power module for recuperative operation, the drive 3 of the vehicle 1 can brake recuperatively, the braking energy flowing back into the energy store 4 in electrical form. If the energy store 4 is fully charged by recuperation, at the next stop having a supply unit 5 the vehicle 1 feeds energy back into the stationary energy supply 6.

In the case of a drive 3 with a linear motor 10' as shown in FIG. 1a, the linear motor can serve as a coupling transformer 10' as shown above, with energy from the stationary part 11' of the motor being transferred to the part 13' of the motor on the vehicle side, for example at a stop. An advantage of this embodiment is the multiple utilization of existing parts of the drive, such as the linear motor and the frequency converter, for driving the vehicle and transferring energy.

For the purpose of wireless energy transfer, instead of the coupling transformer 10 there can be a capacitive coupling in which the transfer of energy over the air gap takes place between capacitor plates. Each line is provided with a capacitor having a plate on the stationary side and a plate on the vehicle side, the transfer of energy taking place across the air gap lying between the plates.

FIG. 3 shows a further embodiment for the wireless transfer of energy from a stationary energy supply 6 to a vehicle 1 forming a movable energy consumer. A stationary laser device 19 controlled by a control 18 on the vehicle side emits light 19.1 which reaches an absorber 20 on the vehicle side. The light 19.1 reaches the absorber 20, for example, at any position of the vehicle or only at certain positions of the vehicle. The absorber 20 has a strongly light-absorbing surface, and serves as a converter of light energy into thermal energy. By means of a thermoelectric element 21 the thermal energy is converted into electrical energy, which serves via the energy store 4 to operate the drive 3 and thereby to move the vehicle 1. The control 18 is connected to the laser device 19 and ensures that energy is only transferred when the energy is required for charging the energy store 4 and/or for moving the vehicle 1. Data such as, for example, the quantity of energy or the time at which energy is transferred is registered by the control 18. The absorber 20 can take the form of, for example, a piece of metal with a black surface. For the thermoelectric element 21 suitable semiconductors, for example, can be used. Conversion of thermal into electrical energy can also take place by means of a gas or a liquid, which is heated by means of the absorber 20 and which delivers mechanical energy to an electric current generator when stress is relieved.

FIG. 4 shows a further embodiment for the wireless transfer of energy from the stationary energy supply 6 to the vehicle 1 forming a movable energy consumer. A stationary microwave device 22 controlled by a control 25 on the vehicle side radiates waves 22.1 of high frequency which are received by an antenna 23 on the vehicle side and delivered to a demodulator 24 which converts the waves 22.1 received into direct voltage which, by means of the energy store 4, serves to operate the drive 3 and thereby to move the vehicle 1. The control 25 is connected to the microwave device 22 and ensures that energy is only transferred when the energy is required for charging the energy store 4 and/or for moving the vehicle 1. Data such as, for example, the quantity of energy or the time at which energy is transferred is registered by the control 25. Production of the microwaves 22.1 can be, for example, by means of a magnetron, and suitable semiconductors can be used for demodulation of the waves 22.1.

The invention is not limited by the embodiments described above which are presented as examples only but can be modified in various ways within the scope of protection defined by the appended patent claims.

What is claimed is:

1. An elevator, comprising: at least one elevator car which can be moved in an elevator hoistway; an elevator drive for driving the elevator car; a stationary energy supply; and means operatively connected between the energy supply and the elevator car for wirelessly transferring energy from the energy supply to the elevator car, the transferring means including means for inductively transferring electrical energy, the inductive transferring means including a coupling transformer which has a stationary primary winding and a secondary winding on the elevator car so that a transfer of energy takes place across an air gap located between the primary winding and the secondary winding, the drive including a linear motor provided as the coupling transformer for inductively transferring electrical energy and for moving the elevator car.

2. A device for transmission of energy to a vehicle of a transportation system, comprising: a stationary energy supply; means operatively connected between the energy supply and the vehicle for wirelessly transferring energy from the energy supply to the vehicle, the transferring means including means for inductively transferring electrical energy, the inductive transferring means including a coupling transformer which has a stationary primary winding and a secondary winding on the vehicle so that a transfer of energy takes place across an air gap located between the primary winding and the secondary winding; and a drive for moving the vehicle, the drive including a linear motor provided as the coupling transformer for inductively transferring electrical energy and for moving the vehicle.

3. A device according to claim 1, wherein the vehicle is an elevator car.

* * * * *